United States Patent [19]

Johnson, Jr. et al.

[11] Patent Number: 4,605,428
[45] Date of Patent: Aug. 12, 1986

[54] SINTERED HIGH-SILICA GLASS AND ARTICLES COMPRISING SAME

[75] Inventors: David W. Johnson, Jr., Pluckemin; John B. MacChesney, Lebanon; Eleizer M. Rabinovich, Berkeley Heights, all of N.J.

[73] Assignee: AT&T Bell Laboratories, Murray Hill, N.J.

[21] Appl. No.: 637,492

[22] Filed: Aug. 3, 1984

[51] Int. Cl.⁴ .................. C03B 19/06; C03B 37/016
[52] U.S. Cl. .............................................. 65/2; 65/17; 65/18.1
[58] Field of Search ............... 65/18.1, 18.2, 17, 134, 65/2; 501/12; 264/56

[56] References Cited

U.S. PATENT DOCUMENTS 4,419,115  12/1983  Johnson et al. .................. 65/3.12

FOREIGN PATENT DOCUMENTS 84438     7/1983  European Pat. Off. ............ 65/18.1
59-116178 7/1984  Japan ................................. 65/18.1

OTHER PUBLICATIONS

*Journal of Non-Crystalline Solids* 63 (1984), North Holland, Amsterdam, "Sol-Gel Preparation of Transparent Silica Glass", pp. 155-161, by E. M. Rabinovich et al.
*Treatise on Materials Science and Technology*, vol. 22, 1982, "Gel Making for Making Glass" by S. Sakka, pp. 129-167.
*Advanced Experimental Techniques in Powder Metallurgy*, vol. 5 (1970) J. S. Hirschhorn and K. H. Roll, editors, "A Review of Mercury Porosimetry" by H. M. Rootare, pp. 225-252.
*Journal of the American Ceramic Society*, vol. 66, No. 10 Oct. 1983, "Preparation of High-Silica Glasses from Colloidal Gels: I, Preparation for Sintering and Properties of Sintered Glass" pp. 683-688, by E. M. Rabinovich et al.

Primary Examiner—Kenneth M. Schor
Attorney, Agent, or Firm—Eugen E. Pacher

[57] ABSTRACT

High silica glass is formed by sintering a dried gel. The gel has a pore size distribution such that at most about 5% of the total pore volume is contributed by pores having an effective pore diameter greater than about 0.5 μm, and such that at least 10% of the total pore volume is contributed by pores having an effective pore diameter greater than about 0.02 μm. This pore size distribution permits effective migration of fluid into, and out of, the gel, permits sintering at a lower temperature, and results in increased perfection of the glass. The pore size distribution can be achieved by appropriate comminution, e.g., ball-milling, of intermediate material. A novel process for forming high silica glass is also disclosed. The process comprises forming intermediate material by hydrolysis of one or more metal alkoxides, comminuting the intermediate material to produce colloidal particles, forming a sol by dispersing the particles in liquid, gelling the sol, drying the gel, and sintering the dried gel.

9 Claims, 5 Drawing Figures ical limits
SINTERED HIGH-SILICA GLASS AND ARTICLES COMPRISING SAME

FIELD OF THE INVENTION

This invention pertains to methods for producing high-silica glass comprising sintering of a porous high-silica body.

BACKGROUND OF THE INVENTION

A method for fabricating sintered high silica glasses has been disclosed by us in U.S. Pat. No. 4,419,115, (the '115 patent) co-assigned with this, and incorporated herein by reference. The method disclosed in the patent comprises forming a first silica-containing material, forming particles from the first material, redispersing the particles, forming a gel from the redispersed particles, drying the gel, thereby producing a porous body, and thereafter sintering the porous body to form a glass. This method is referred to herein as the double-dispersion method. The double-dispersion process was found to substantially reduce the likelihood of cracking of the drying gel body, as compared to bodies produced by single-dispersion sol-gel processes. As disclosed in the '115 patent, particles typically are formed by fragmentation of dried gel material in a blender.

Another prior art gel method for producing high silica glass uses hydrolysis of one or more metal alkoxides. The alkoxide process has, for instance, been described by S. Sakka in *Treatise on Materials Science and Technology*, Vol. 22, M. Tomozawa and R. H. Doremus, editors, Academic Press, 1982, pp. 129–167, incorporated herein by reference. After hydrolysis of the alkoxide, the reulting high silica gel is dried, to the extent this is possible, and the resulting material, herein also referred to as a gel, sintered to form glass therefrom.

Dry gel material produced by the process of the '115 patent has, prior to sintering, a pore size distribution exemplified by the distribution shown in FIG. 1. The Figure reveals that a substantial fraction of the total pore volume of the prior art material is contributed by pores of effective diameter larger than about 0.04 $\mu$m (40 nm) with a significant peak at about 2 $\mu$m (4000 nm). In particular, glass produced by prior art double-dispersion sol-gel processes typically has, prior to sintering, significantly more than 5% of its total pore volume contributed by pores of effective diameter greater than about 0.5 $\mu$m. These large pores are difficult to collapse during sintering, requiring a relatively high sintering temperature, and may result in glass defects.

On the other hand, gel material produced by the prior art monolithic (i.e., not comprising comminution of the first material) alkoxide process typically has, prior to sintering, very small pores. In particular, such material typically has a pore size distribution such that more than 90% of the total pore volume is contributed by pores of effective diameter substantially less than about 0.01 $\mu$m. This lack of larger pores makes the migration of fluid out of, or into, the body difficult, resulting in disadvantageous processing characteristics of such material. For instance, due to the lack of larger pores, it is virtually impossible to completely dry the gel.

Due to the potential of sol-gel processes for economically producing high quality high silica glass, a process that can produce glass of improved quality at a lower sintering temperature is of considerable interest. This application discloses such a process.

GLOSSARY OF TERMS

High silica material herein is solid material comprising more than 50% (typically more than 90% silica ($SiO_2$), by weight of the solid material.

A glass body herein is a substantially pore-free, solid, noncrystalline body.

The pore size distribution of a porous body herein is the pore size distribution of a representative sample of material of the porous body, with the distribution determined by means of mercury intrusion porosimetry. It is to be noted that results obtained by this method typically are uncertain to at least within ±10% to ±15% of the measured value, and all relevant numerical limits disclosed herein are intended to be understood to have the same uncertainty.

The "effective pore diameter" herein is the pore diameter value as calculated, by means of Washburn's equation, from the intruded mercury volume versus pressure curve, as determined by mercury intrusion porosimetry, assuming a contact angle of 140°, and surface tension between $SiO_2$ and Hg of 485 dyn/cm. See: "A Review of Mercury Porosimetry," H. M. Rootare, pp. 225–252 of *Advanced Experimental Techniques in Powder Metallurgy*, vol. 5, J. S. Hirschhorn and K. H. Roll, editors, Plenum Press (1970).

The "sintering" temperature herein is the highest temperature of the following procedure, provided the procedure results in transformation of a porous cylinder of ½ inch starting diameter, into a glass body:

(a) heating the cylinder to 1000° C. at a rate of 400° C./hour;
(b) soaking the clyinder at 1000° C. for 2 hours;
(c) heating the cylinder to the highest temperature of the procedure at a rate of 200° C./hour;
(d) maintaining the cylinder at the highest temperature of the procedure for 1 hour;
(e) cooling the cylinder to 700° C. within 20–30 minutes;
(f) whenever the cylinder is at a temperature greater than 700° C., He is flowed through the furnace at a rate of at least 1 l/min.

SUMMARY OF THE INVENTION

Disclosed is a method of fabricating high-silica glass. The method comprises forming a substantially dry porous body by a method comprising comminuting intermediate high silica material, and forming a gel comprising particles produced by the comminution. The porous body has a pore size distribution such that at least about 10%, typically between about 10% and about 50%, of the total pore volume is contributed by pores having an effective pore diameter that is greater than about 0.02 $\mu$m, and such that at most 5%, preferably less than 1%, of the total pore volume is contributed by pores having an effective pore diameter greater than about 0.5 $\mu$m. The pore size distribution thus comprises a smaller proportion of very small pores than is typically found in material produced by prior art alkoxide processes, and a smaller proportion of large pores than is typically found in material produced by prior art double-dispersed sol-gel processes.

The porous body is sintered in an appropriate temperature and thereby transformed into a high silica glass. The sintering temperature of porous bodies according to the invention typically is lower than about 1400° C., typically at least about 50° C. lower than the temperature required to sinter prior art material differing from material according to the invention only in having substantially more than 5% of its total pore volume contributed by pores of effective diameter greater than 0.5 μm.

The novel distribution of pore sizes in the porous body is advantageously achieved by forming the intermediate high silica material by a gel process, e.g., by an alkoxide process, or by a process that uses colloidal particles to form a sol, and a gel therefrom. The thus formed intermediate material is then appropriately comminuted, e.g., by ball-milling. In a preferred embodiment of the invention, the comminution is carried out such that the material to be comminuted comes in contact only with surfaces of the comminution apparatus that consist essentially of high silica glass (e.g., fused silica), thereby reducing the danger of contaminating the glass. Such contamination is undesirable, since, inter alia, it may cause crystallization during sintering.

The high silica glass produced according to the invention can be used to produce glass articles such as optical preforms optical fiber, lenses, prisms, and other known articles of manufacture.

Disclosed is also a process for fabricating high silica glass that comprises formation of intermediate high silica material by an alkoxide process, typically comminution of intermediate material to form colloidal particles therefrom, dispersion of the colloidal particles in a liquid, thereby producing a sol, gellation of the sol, substantially drying the gel, and sintering the dry gel. The porous bodies formed by the inventive process, to be termed the alkoxide/colloidal sol-gel process, need not necessarily have (but preferably will have) the above specified pore size distribution.

DETAILED DESCRIPTION

The inventive method can be practiced with any appropriate intermediate high silica material, e.g., material produced by a colloidal sol-gel method, or material produced by hydrolyzing one or more metal alkoxides. Intermediate material can be either substantially dry, or can contain substantial amounts of water or other liquid. In particular, if prepared by a gel or alkoxide method, the intermediate material can be undried, partially dried or dried material.

Any appropriate method for producing intermediate material is considered to be within the scope of the invention, provided that the dried porous body (the dried gel) produced from such particles has a pore size distribution having the specified characteristics, i.e., less than 5% of the total pore volume contributed by pores having effective diameter greater than about 0.5 μm, and at least 10% of the total pore volume contributed by pores having effective pore diameter greater than 0.02 μm.

We have found that substantially reducing the pore volume due to large pores has several desirable results. In particular, it results in a lowered sintering temperature, typically less than 1400° C. Since the appropriate sintering temperature depends, inter alia, on the chemical composition of the material to be sintered, no general numerical limit can be given. However, we have found that the sintering temperature of a porous body prepared according to the invention is typically at least about 50° C. lower than that of a body consisting of material that differs from the material according to the invention only in having more than about 5% of its total pore volume contributed by pores of effective size greater than 0.5 μm.

Figure 2:
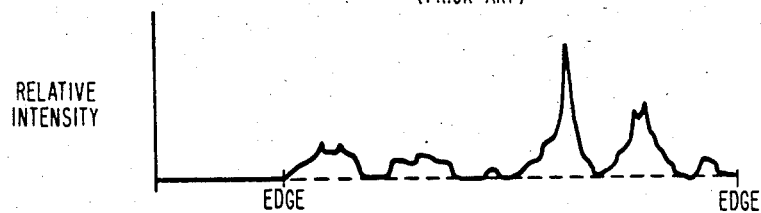
FIG. 2 shows an exemplary curve of scattered light intensity as a function of position in prior art glass.
Figure 4:
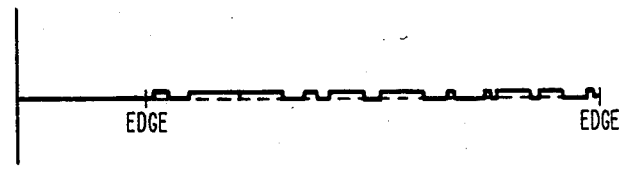

In addition to the obvious advantage of energy economy, a lower sintering temperature is advantageous since it typically reduces contamination of the glass from the environment, e.g., the furnace or the muffle, it reduces the possibility of devitrification, and, importantly, reduces the deformation, i.e., unwanted nonuniform shape change, that the body undergoes during sintering. Furthermore, reducing the number of large pores in the porous body leads to a reduction in the number of defects present in the glass formed therefrom. This is illustrated by FIGS. 2 and 4, with FIG. 2 showing the relative intensity of scattered light detected by a detector that is scanned along a rod-shaped glass sample produced by the method of the '115 patent, with a probe light beam propagating axially through the rod. FIG. 4 shows the relative intensity of light scattered from a similar sample of glass prepared according to the invention. The light scattering being due to the presence of defects in the glass, the reduction of defect density in glass produced according to the invention is evident from a comparison of the two Figures.

The requirement that at least 10% of the total pore volume of the dried gel be contributed by pores having effective pore size greater than about 0.02 μm is due to the need for fluids to be relatively free to migrate from the interior of the gel body to the surface (e.g., during drying), or to migrate into the body from the surface (e.g., during "dehydration" by gas phase reaction, or during gas phase fluoridation or other doping of the material).

The pore size distribution found in the dried body before sintering is a function of the size and nature of the particles or aggregates used to form the sol, and subsequently the gel, from which the body is formed. In particular, we have found that substantially eliminating, through comminution, aggregates greater than about 10 μm in diameter produces advantageous results. Such comminution can be carried out by any appropriate means, but, in order to avoid contamination of the glass, it is desirable to carry out the comminution in equipment wherein contact of the intermediate material, and of the fragments and particles formed therefrom, is limited to high silica glass surfaces. For instance, we have formed particles from intermediate material by ball-milling in high silica glass containers, preferably borosilicate glass or fused silica containers, charged with short fused silica cylinders (e.g., 1.3 cm diameter, 1–1.5 cm length).

Figure 1:
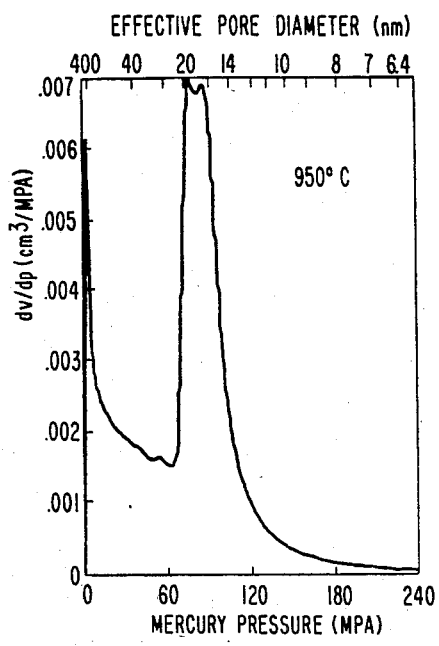
FIG. 1 shows an exemplary pore size distribution in prior art porous bodies.
Figure 3:
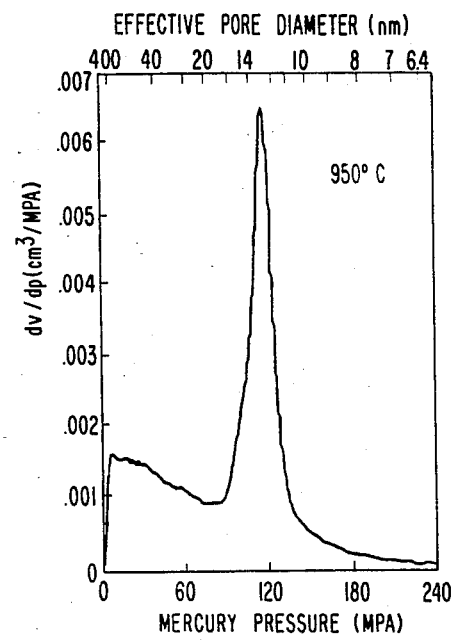
FIGS. 3 and 4 show pore size distribution and scattered light intensity, respectively, of porous bodies and glass, respectively, produced by the inventive method.

FIGS. 1 and 3 show pore size distributions, obtained by means of mercury intrusion porosimetry, for porous material prepared according to the process of the '115 patent, and according to the invention, respectively. The prior art distribution has a significant peak at about 2 μm effective pore diameter. The process according to the invention has eliminated the peak, as can be seen from FIG. 3, and, in general, has essentially eliminated the contribution of pores of effective pore diameter greater than 0.5 μm to the total pore volume.

Following, or concurrent with, formation of particles from intermediate material a sol is formed, by dispersing particles in a liquid. A gel is then formed from the sol, the gel is substantially dried, and the resulting porous body sintered to produce glass. These steps can be carried out in any appropriate manner, for instance as described in the '115 patent. Prior to sintering, additional steps, such as "dehydration" (OH-removal) by means of exposure to chlorine or other appropriate gas, fluoridation or other doping, can be carried out. Such treatments are familiar to those skilled in the art. Porous bodies can be sintered individually, or composite bodies can be assembled from individual bodies, e.g., a thick walled cylinder can be assembled from several appropriately dimensioned thin walled cylinders. Such individual bodies, of course, can all have the same composition, or differ in composition from each other, such as to result in a glass body having a predetermined nonuniform composition, i.e., a doping profile. Furthermore, glass produced according to the invention can be further processed, either by itself, or in combination with glass produced by other methods, to form therefrom other bodies, e.g., optical preforms, optical fiber drawn from optical preforms, lenses, prisms, and other articles that are commonly made from high silica glass.

Figure 5:
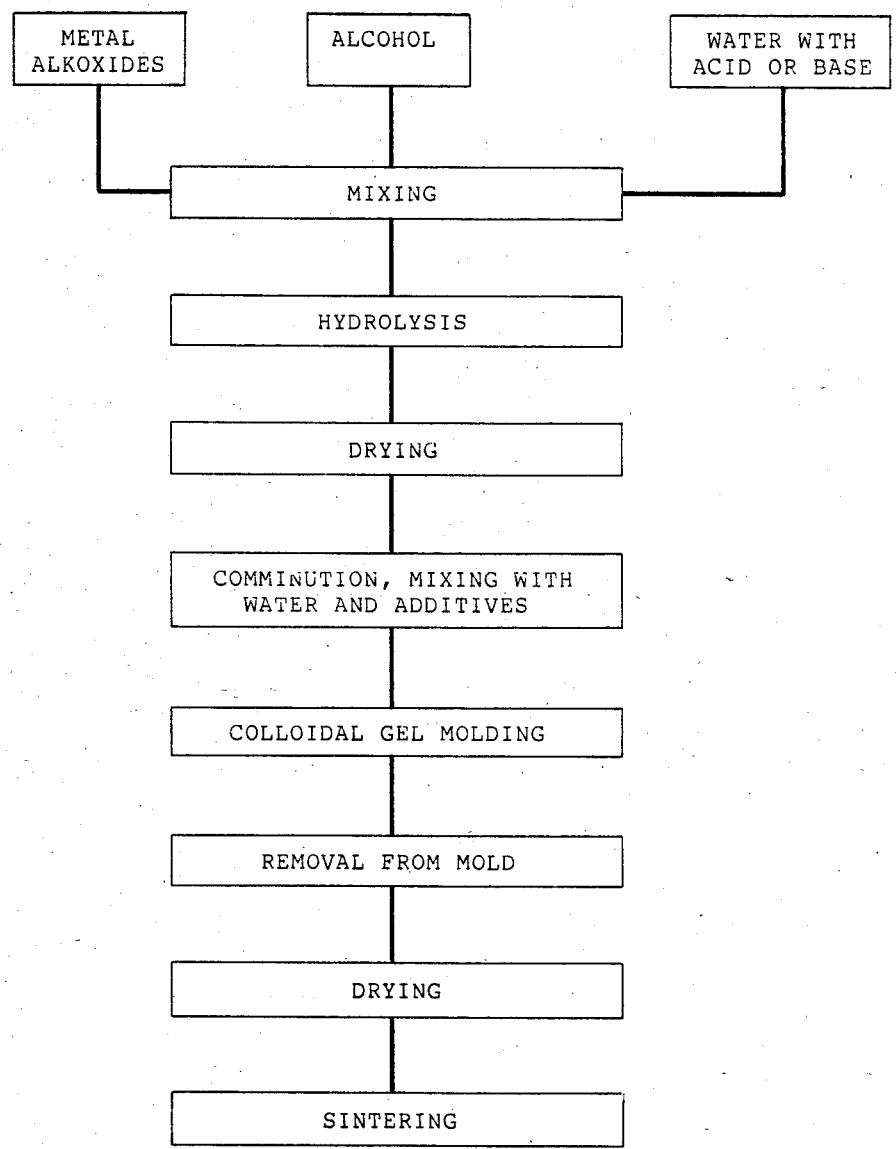
FIG. 5 is a schematic representation of representative steps of an exemplary alkoxide/colloidal sol-gel process.

As was pointed out above, the alkoxide/colloidal sol-gel process has general applicability, and is considered by us to be an advantageous process for manufacturing high silica glass, including high purity glass, doped or undoped, for optical preforms, optical fiber, and the like. The process comprises several steps. This is schematically shown in FIG. 5 for an exemplary embodiment of the novel alkoxide/colloidal sol-gel process. One or more alkoxides (e.g., $Si(OC_2H_5)_4$ and alkoxide dopants), alcohol, and water with acid or base, are mixed, thereby inducing processes comprising hydrolysis, resulting typically in formation of a gel. After partial drying of the thus formed material, the material is comminuted to form particles of substantially colloidal size which, when mixed with water, can form a sol. The sol, after transferring it to an appropriately shaped mold, is allowed to gel and, after removal from the mold, the resulting gel body is dried and then sintered. Depending on the details of the comminution process, the dried gel can have, or does not have, a pore size distribution according to the instant invention. For instance, ball milling of the partially dried intermediate material for about 4-24 hours can result in a gel body according to the invention, whereas comminution of the intermediate material in a blender typically results in a gel body having a prior art pore size distribution, such as is exemplified by the distribution of FIG. 1.

EXAMPLE I 150 g of once-dispersed and dried $SiO_2$ gel, prepared substantially as described in the first three paragraphs of Example I of the '115 patent, was introduced into a 1 liter small mouth borosilicate glass jar, together with about 260 g of deionized $H_2O$ and about 600 g of short fused $SiO_2$ rods (about 1.3 cm diameter, 1–1.5 cm length). The jar was rolled at about 100 RPM for about 24 hours and the resulting sol processed, substantially as described in Example I of the '115 patent. A small fragment (less than 0.5 g) of the thus formed gel body the body having (approximately 1 cm diameter, 30 cm length) was subjected to mercury porosimetry. The thus determined pore size distribution was substantially as shown in FIG. 3. Sintering the remaining dry gel rod at about 1300° C. produced a transparent glass rod, of measured density 100% of theoretical. The relative intensity of light scattered from the glass rod was determined, with the result being qualitatively similar to that shown in FIG. 4.

EXAMPLE II

A glass body was prepared substantially as described in Example I, with the exception that the particles formed from the 150 g of once-dispersed and dried $SiO_2$ gel were dried, heated to about 900° C. for 4 hours, then dispersed in 270 g $H_2O$. The resulting porous body, and the glass body produced therefrom, had pore size distribution and light scattering densities, respectively, similar to those shown in FIGS. 3 and 4, respectively.

EXAMPLE III 520 g of tetraethylorthosilicate mixed with 460 g of ethyl alcohol were added to an aqueous solution of $NH_4OH$(pH=11) and mixed for 30 minutes. The mixture was soaked in a closed container, in a drying oven at 60° C. for 24 hours, then the container opened to atmosphere and the temperature in the oven increased to 150° C. The resulting 150 g of partially dried silica gel material was comminuted and further processed, substantially as described in Example I, with the exception that the gel was heated in an oxygen-comprising atmosphere to about 800° C., whereby residual carbon compounds in the gel were burnt off. The dried gel body had a pore size distribution substantially as shown in FIG. 3, and the resulting glass body had a light scattering intensity similar to that shown in FIG. 4.

EXAMPLE IV

A glass body is prepared substantially as described in Example III, except that the intermediate material is comminuted by blending for about 15 minutes in a high shear Waring blender, substantially as described in Example I of the '115 patent. The dried gel material has a pore size distribution qualitatively similar to the distribution shown in FIG. 1, and is sintered at about 1450° C.

EXAMPLE V

A glass body was prepared substantially as described in Example III, except that an aqueous solution of HCl(pH=1) was used instead of the aqueous solution of $NH_4OH$. The resulting porous body had a pore size distribution substantially as show in FIG. 3, and the resulting glass body had a light scattering intensity similar to that shown in FIG. 4.

What is claimed is:

1. Method of fabricating a high silica glass body, the method comprising
   (a) forming a first gel, the first gel formed either
      (i) by a first process that comprises forming a first sol by dispersing first particles in a liquid, with the first particles consisting substantially of colloidal silica particles, and gelling the first sol, or
      (ii) by a second process comprising hydrolyzing at least one metal alkoxide;
   (b) at least partially drying the first gel, thereby forming an intermediate high silica material;
   (c) forming second particles by comminution of intermediate high silica material;

(d) forming a second sol by dispersing the second particles in a liquid;

(e) gelling the second sol to form a second gel;

(f) substantially drying the second gel, whereby a substantially dry porous body is formed, the porous body having a pore size distribution, such that at most about 5% of the total pore volume of the porous body is contributed by pores having an effective pore diameter greater than about 0.5 $\mu$m, and such that at least about 10% of the total pore volume of the porous body is contributed by pores having an effective pore diameter that is greater than about 0.02 $\mu$m; and (g) sintering the porous body at a sintering temperature, whereby a high silica glass body is produced.

2. Method of claim 1, wherein the pore size distribution is such that at most about 1% of the total pore volume of the porous body is contributed by pores having an effective pore diameter greater than about 0.5 $\mu$m.

3. Method of claim 1, wherein the high silica glass body is an optical fiber preform comprising the glass body formed in step (g).

4. Method of claim 3, further comprising producing an optical fiber from the optical fiber preform.

5. Method of claim 1, wherein the intermediate high silica material is, prior to formation of particles therefrom, substantially dry.

6. Method of claim 1, wherein the sintering temperature is at most about 1400° C.

7. Method of claim 5, wherein the sintering temperature is at least about 50° C. less than the temperature required to sinter a second porous body that differs from the first porous body only in that more than 5% of the total pore volume of the second porous body is contributed by pores having an effective pore diameter greater than about 0.5 $\mu$m.

8. Method of claim 1, wherein comminution is carried out in comminution means having intermediate-material-contacting surfaces, and wherein during comminution the intermediate material, and fragments and particles formed therefrom, is in contact only with intermediate-material-contacting surfaces consisting essentially of high silica glass.

9. Method of claim 8, wherein the comminuting means comprise ball-milling means comprising an intermediate-material container consisting essentially of borosilicate glass or of fused $SiO_2$, the intermediate-material container charged with a muliplicity of bodies consisting essentially of fused $SiO_2$.

* * * * *